Patented Aug. 24, 1954

2,687,345

UNITED STATES PATENT OFFICE 2,687,345

ETCHING COMPOSITION FOR LITHOGRAPHIC PLATES

Margaret H. Murray, Stamford, Conn., assignor, by mesne assignments, to Printing Developments, Inc., New York, N. Y., a corporation of New York No Drawing. Application November 22, 1950, Serial No. 197,166

2 Claims. (Cl. 41—42)

This invention relates to an etching composition for use in the preparation for offset printing of bimetal lithographic plates having a chromium surface and a gelatinous resist coating.

Recently a bimetal lithographic plate having a chromium surface plated on a copper base has come into use. In the preparation of this plate for offset printing it is necessary in selected areas to etch through the chromium surface to expose the underlying copper surface, while protecting other areas with a coating of gelatinous material. The etch is accomplished by hydrochloric acid, which is employed in solution in a carrier designed to reduce as much as possible the softening action of hydrochloric acid on the gelatinous coating used as the resist. Any softening or cracking of the resist will result in an etching of the chromium outside of the desired image area and thereby destroy the usefulness of the plate.

A variety of carriers for use with hydrochloric acid etching compositions have been proposed. Mixtures of hydrochloric acid and aliphatic glycols have been suggested, but these solutions etch chromium very slowly and when they are used the resist must be subjected to the etching solution for a very long time. This permits the etch to absorb moisture from the atmosphere, and attack on the gum coating is thereby increased. Solutions of hydrochloric acid and calcium chloride have also been proposed. However, the concentration of calcium chloride required to reduce the acid attack on the resist is above the solubility of calcium chloride in aqueous hydrochloric acid at named etching temperatures. While it is sometimes possible to etch the plate with a supercooled calcium chloride solution, at other times the solution may crystallize in the bottle or on the plate during etching. In order to avoid crystallization and still achieve the desired result, part of the calcium chloride has been replaced with other chlorides, such as zinc chloride. Solutions of zinc chloride and calcium chloride, however, have produced side etching or have cracked the resist coating, and then etched the chromium through the cracks of the resist.

Accordingly, it is an object of the present invention to provide a hydrochloric acid etching composition for use with chromium-surfaced bimetal lithographic plates which will dissolve chromium without attacking the gelatinous resist coating on the plate.

It is a further object of the invention to provide an etching composition adapted for use with chromium-surfaced bimetal lithographic plates, containing hydrochloric acid in an amount to dissolve chromium and calcium chloride in an amount to inhibit softening of the resist by the hydrochloric acid, which composition will not precipitate calcium chloride at the etching temperatures.

These objects are achieved by incorporating an aliphatic straight or branched chain polyhydric alcohol having from two to four carbon atoms in the hydrochloric acid-calcium chloride etching composition. Under the temperature conditions ordinarily encountered during the etching, the polyhydric alcohol prevents crystallization of calcium chloride at the concentrations required for prevention of attack of the resist coating by hydrochloric acid.

Inasmuch as the polyhydric alcohol contains from two to four carbon atoms, it may have from two to four hydroxyl groups. A minimum of two hydroxyl groups is essential, and usually it is desirable that the alcohol contain at least one hydroxyl group per carbon atom. Polyhydric alcohols which are suitable include ethylene glycol, propylene glycol, glycerol, methyl glycerol and erythritol.

The etching composition of the invention contains as essential ingredients hydrochloric acid in an amount to etch chromium, calcium chloride in an amount to inhibit attack of the gelatinous resist by hydrochloric acid, and one or a mixture of one or more alcohols selected from the above class of polyhydric alcohols, in an amount to substantially prevent crystallization of calcium chloride at etching temperature.

The composition is employed as an aqueous solution and may be prepared initially in this form. Since hydrochloric acid-containing compositions are highly corrosive and therefore present a hazard when large quantities thereof are shipped or stored, it is ordinarily desirable to postpone addition of hydrochloric acid until the composition is to be used. In most circumstances, therefore, for convenience in handling, a carrier composition is made up containing calcium chloride and polyhydric alcohol, using such proportions of these ingredients that after addition of the prescribed amount of concentrated hydrochloric acid an etching composition ready for use is obtained.

A carrier containing calcium chloride and polyhydric alcohol, to which concentrated (37%) hydrochloric acid is added to form the etching composition, may be prepared by incorporating the polyhydric alcohol in an aqueous solution containing at least 85% calcium chloride. At lower calcium chloride concentrations, a more concentrated hydrochloric acid can be used, but it becomes very difficult to prepare an etching composition with the calcium chloride concentration required to prevent attack of the resist by mere addition of hydrochloric acid. Usually more calcium chloride must be added. For best results it is desirable that the calcium chloride solution contain at least 90% calcium chloride, inasmuch as at these concentrations an etching solution is obtainable which gives a faster etching time.

A very concentrated carrier solution may be prepared by melting pure calcium chloride hexahydrate, $CaCl_2 \cdot 6H_2O$, (melting point 86° F.) and incorporating the polyhydric alcohol therewith. The polyhydric alcohol depresses the melting point of the salt to below room temperature, and a concentrated carrier solution is obtained.

The concentration of polyhydric alcohol in the carrier (and in the etching composition) should be kept at the minimum required to prevent crystallization of calcium chloride. When ethylene glycol is used, as low as 5% is adequate at lower, i. e., 85%, calcium chloride concentrations, but from 10 to 25% ethylene glycol is preferably at the higher, i. e., above 90%, calcium chloride concentrations. The ethylene glycol concentration should not be above 50% because at higher concentrations the etching time is considerably increased. When other polyhydric alcohols are used in place of ethylene glycol, they are substituted therefor in molecularly equivalent amounts.

An etching composition can be prepared from this carrier merely by addition of concentrated hydrochloric acid. If 37% hydrochloric acid is used, an amount in the range of 1 part (by volume) of acid to from 6 to 16 parts of carrier is satisfactory. These proportions are adjusted when acid of other concentrations is added to give an equivalent amount of hydrochloric acid in the etching composition. At lower acid concentrations the etching rate is slow and the etch on the plate is too quickly exhausted. At higher acid concentrations the gelatinous resist coating is attacked to an undesirable extent. One part of acid to 8 parts of carrier gives the fastest etching time with a minimum attack of gelatinous coating, and these proportions are therefore preferred.

The following examples illustrate the preparation and formulation of a number of carrier and etching compositions in accordance with the invention.

*Example 1*

Six carrier compositions were made up by adding ethylene glycol to an aqueous 91% calcium chloride hexahydrate solution in the proportions indicated in the table. Etching compositions were then formed by adding one part (by volume) of 37% hydrochloric acid to each 16 parts of the carrier. These etching compositions were tested on identical chromium-surfaced copper plates with a gum arabic resist, with the following results:

| Carrier | | Etching Time to Expose First Copper (Minutes) |
|---|---|---|
| Ethylene Glycol | $CaCl_2 \cdot 6H_2O$ (91%) | |
| *Percent* | *Percent* | |
| 100 | 0 | Not etched |
| 70 | 30 | 14.2 |
| 50 | 50 | 6.2 |
| 40 | 60 | 4.3 |
| 20 | 80 | 2.5 |
| 10 | 90 | 2.2 |
| 5 | 95 | 2.3 |

In no case was there any detectable side etching, as evidenced by the printing dots. It will be noted that at concentrations of ethylene glycol above 50% by weight the etching time is considerably increased. Satisfactory etching times are obtained at from 5 to 20% ethylene glycol. No crystallization of calcium chloride was noted at any stage of the procedure.

Another series of etching compositions was made up exactly as set forth above, with the exception that an aqueous 79% calcium chloride hexahydrate solution was used. Every one of these etching compositions seriously attacked the gum arabic resist coating, causing enlarged printing dots, showing that the concentration of calcium chloride was too low.

*Example 2*

A carrier is prepared as follows:

| | | |
|---|---|---|
| Calcium chloride [1] | lb. | 100 |
| Water | gal. | 7 |

[1] Commercial grade anhydrous.

Adjust specific gravity to 1.465 at 120° F. or 46.9° Bé. at 70° F. The calcium chloride concentration is then about 94%, calculated as the hexahydrate.

Add—

Ethylene glycol, 18 lb.

The final specific gravity should be 44.6° Bé. at 70° F. ±0.2° Bé. This carrier may be stored indefinitely without crystallization of calcium chloride.

An etching composition is made up, ready for use, by adding 1 part of 37% hydrochloric acid to each 8 parts of the carrier. This composition will not attack the resist, does not precipitate calcium chloride, and will etch a chromium-surfaced copper plate in about 2 minutes.

The etching composition of the invention may be used in conjunction with any type of lithographic plate having a chromium surface and coated with a gelatinous resist, and is particularly useful with chromium-surfaced copper plates.

Numerous modifications may be made in the invention, as will be evident to those skilled in the art.

In the specification and claims all parts are by volume and all percentages are by weight. Except as otherwise noted in the specification, where calcium chloride is mentioned, the hexahydrate is intended, and all percentages of calcium chloride are calculated as $CaCl_2 \cdot 6H_2O$. Proportions of the polyhydric alcohol are in terms of ethylene glycol, but it will be understood that proportions of other polyhydric alcohols will be molecularly equivalent to those given for ethylene glycol.

I claim:

1. A composition capable of etching chromium and adapted for use in the preparation for offset printing of bimetal lithographic plates having a chromium surface and a gelatinous resist coating, said composition comprising hydrochloric acid in an amount to etch chromium, calcium chloride in an amount of at least about 80% to inhibit attack of the resist by hydrochloric acid and an aliphatic polyhydric alcohol having from two to four carbon atoms in an amount of at least 5% to substantially prevent crystallization of calcium chloride at the etching temperature.

2. A composition in accordance with claim 1 in which the polyhydric alcohol is ethylene glycol.

References Cited in the file of this patent

UNITED STATES PATENTS

| Number | Name | Date |
|---|---|---|
| 1,997,735 | Lund | Apr. 16, 1935 |
| 2,230,156 | Carman | Jan. 28, 1941 |
| 2,270,712 | Wood | Jan. 20, 1942 |
| 2,572,228 | Whyzmuzis | Oct. 23, 1951 |